(12) United States Patent
Lloyd et al.

(10) Patent No.: US 7,017,015 B2
(45) Date of Patent: Mar. 21, 2006

(54) METHOD AND SYSTEM FOR COORDINATING THE ACCESS OF DATA BY TWO COMPUTER PROCESSES

(75) Inventors: Robert F. Lloyd, Muskego, WI (US); Paul B. Shepherd, Wauwatosa, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 591 days.

(21) Appl. No.: 10/327,332

(22) Filed: Dec. 20, 2002

(65) Prior Publication Data

US 2004/0123051 A1   Jun. 24, 2004

(51) Int. Cl.
   *G06F 12/00* (2006.01)
(52) U.S. Cl. .................. 711/145; 711/147; 711/156
(58) Field of Classification Search ............. 711/145, 711/147, 156
   See application file for complete search history.

(56) References Cited

U.S. PATENT DOCUMENTS 6,658,538 B1 * 12/2003 Arimilli et al. ............. 711/141
6,889,293 B1 *  5/2005 Kaxiras et al. ............. 711/147

* cited by examiner

*Primary Examiner*—Mano Padmanabhan
*Assistant Examiner*—Mehdi Namazi
(74) *Attorney, Agent, or Firm*—Quarles & Brady, LLP; Alexander M. Gerasimow

(57) ABSTRACT

A method and system are disclosed for governing access to stored data by first and second of processing devices for the purpose of writing to or modifying the stored data and reading the stored data. In one embodiment, the method includes determining whether first and second single-bit flags associated with a first data portion are the same or different and performing one of a first operation and a second operation (e.g., writing or reading operations) depending upon whether the first and second flags are the same or different, where the first and second operations are respectively performed by the first and second processing devices. The method further includes changing one of the first and second flags upon completion of the operation, where the first value is changed if the first operation was performed, and where the second value is changed if the second operation was performed.

19 Claims, 3 Drawing Sheets

METHOD AND SYSTEM FOR COORDINATING THE ACCESS OF DATA BY TWO COMPUTER PROCESSES

CROSS-REFERENCE TO RELATED APPLICATIONS

- - -

FIELD OF THE INVENTION

The present invention relates to methods and systems for storing information and, in particular, relates to such methods and systems that govern access to the stored information by multiple users or processing devices.

BACKGROUND OF THE INVENTION

It is frequently the case that multiple computer processes need to share data that is stored in a single memory location. In many of these situations, one computer process acts as a producer of a given data block while another computer process acts as a consumer of the given data block. That is, the first computer process provides an initial version of the data and may periodically seek to update or change the data, while the second computer process merely reads the data so that the data can be used in the second computer process. Depending upon the system, the roles of the first and second computer processes can be reversed from data block to data block, or different computer processes can interact with respect to different data blocks. That is, where multiple data blocks are being shared, the first computer process can act as the producer with respect to certain data blocks, with the second computer process acting as the consumer with respect to those data blocks, and at the same time the first computer process can act as the consumer with respect to others of the data blocks, with the second computer acting as the producer with respect to those other data blocks. Also, while first and second computer processes may share particular data blocks, the first or second computer processes may share other data blocks with other computer processes.

Although only involving two computer processes (with respect to a given data block), the sharing of data in these bi-directional transactions nonetheless can give rise to certain difficulties. In particular, during operation, it is possible that the first computer process might attempt to update/modify a given data block while the second computer process is reading that data block, before the second computer process has completed reading that data block. Also, it is possible that the second computer process might attempt to start reading a given data block while the first computer process is still writing to that data block.

To alleviate these problems, various systems have been developed to coordinate the activities of the computer processes in accessing the data blocks. Typical systems employ one or more handshaking flags that are accessed by both of the computer processes as they attempt to access data blocks. When one of the computer processes completes its accessing of a data block, it modifies the handshaking flags in such a way as to indicate that the computer process has completed its accessing of the data.

Yet these systems can encounter problems on occasion when one of the computer processes attempts to access and modify the handshaking flags (because that computer process wishes to access a given data block) while the other computer process has not completed its operation on its data block. In such cases, the computer processes collide with one another, which can result in the loss of handshaking data (e.g., the "clobbering" of handshaking data).

For example, in one conventional embodiment, a single byte (e.g., eight-bit) handshaking flag can be employed as an indication of two computer processes' use of data blocks. The byte can be set to a value of, for example, 00000000 at the start of operations, and the system can be configured so that the first computer process tends to modify the third bit after completing its accessing of a data block while the second computer process tends to modify the eighth bit after completing its accessing of a data block. Each computer process recognizes when it is an appropriate time to access a data block based upon the handshaking flag.

If such a system was employed, handshaking data could be lost as follows. Suppose that the first computer process accessed the handshaking flag when that process began to access a certain data block, that at a short time later the second computer process accessed the handshaking flag when that process began to access a different data block, and that the second computer process finished its accessing of its data block prior to the first computer process finishing its accessing of its data block. Because both the first and second computer processes accessed a respective data block, the proper conversion of the handshaking flag would be a change from 00000000 to 10000100. However, given the above succession of events, it could happen that the byte value would be switched to 10000000 by the second computer process and then subsequently switched to 00000100 by the first computer process as each respective process completed its operations, because the first computer process never became aware of the second computer process's accessing of data. That is, the switching of the eighth bit from 0 to 1 by the second computer process would be lost or "clobbered" by the operation of the first computer process.

To address the problems associated with this type of handshaking system, several additional modifications to this type of conventional handshaking system have been developed. Yet each of these modifications creates further problems. For example, one such modification involves the execution of a lockout procedure with respect to a data block whenever a computer process is accessing that data block, which can be implemented either in hardware or in software. Such a procedure renders it impossible for a second computer process to access the handshaking flag associated with a given data block whenever that data block is being accessed by a first computer process. However, while effective in preventing the collision/clobbering problem described above, this type of modification slows down the accessing of data since the lockout procedure requires additional steps of operation.

Another modification of the conventional handshaking system involves allocating a separate amount of memory (e.g., a separate byte) for separate handshaking flags of each computer process, so that when one computer process accesses and modifies its own handshaking flag, this does not impact that handshaking flag(s) of any other computer process(es). Although such a modification does prevent the loss of data due to the overwriting of one computer process's flag information with that of another computer process, this modification nevertheless introduces other problems. In particular, allocating a separate byte for a handshaking flag for each computer process with respect to each data block increases the memory that is required for such a system, and also can negatively impact the granularity of the size of data that must be transferred.

An additional modification of the conventional handshaking system involves a checking procedure to verify that a change made to the handshaking flag(s) by one of the computer processes was not later improperly overwritten by another computer processes was not later improperly overwritten by another computer process. For example, with respect to the above-discussed situation, such a checking procedure would alert the second computer process that its change of the eighth bit from a zero to a one was overwritten by the operation of the first computer process, such that the second computer process would then adjust the handshaking flag to compensate for the data collision. Though able to detect and correct for data collisions, the introduction of a checking procedure introduces new constraints upon the system. In order to guarantee that a given change to a handshaking flag has not been overwritten, the system must wait for a period of time to allow for any concurrent operations by any other computer process to finish, which can delay the system's overall operation. Further, in order that the waiting periods not be excessively long, the system must be designed to operate so that no accessing of a data block by any computer process takes longer than a maximum amount of time, which further constrains the system's operation.

Therefore, it would be advantageous if a new method and system could be developed for coordinating the access of stored data by two or more processes. In particular, it would be advantageous if such a method and system guaranteed that a first computer process that produced or updated the data did not attempt to update the data while a second computer process was reading that data. Likewise, it would be advantageous if such a method and system guaranteed that the second computer process did not attempt to access the data to read the data while the first computer process was accessing the data for the purpose of updating the data. It further would be advantageous if such a method and system did not require significant increased amounts of memory to store handshaking flags or other indicators employed to coordinate the operation of the multiple computer processes in relation to the stored data, did not significantly slow down system operation, and otherwise did not place significant new constraints upon system operation. It would additionally be advantageous if, during operation of such a method and system, changes made to the handshaking flags by different computer process did not collide with or clobber one another.

BRIEF SUMMARY OF THE INVENTION

The present inventors have recognized that a simplified method and system for coordinating the access to data by multiple computer processes is possible in the case where, with respect to each given data block, one computer process is strictly a producer of (e.g., creates or updates/modifies/writes) the data and another computer processor is strictly a consumer of (e.g., reads) the data. In this particular case, each data block at any given time is in one of two states: a readable state, in which it is appropriate for the consumer computer process to read the data block because the producer computer process has completed an update to the data block which the consumer computer process has not yet read; and, a writable state, in which it is appropriate for the producer computer process to modify the data block because the consumer computer process has completed reading the most recently created/updated data stored in the data block. Thus, with respect to any given data block, coordination of the two computer processes can be achieved simply through the use of two single-bit handshaking flags, one of which is exclusively set by the first computer process and the other of which is exclusively set by the second computer process.

More specifically, whenever either of the two computer processes completes an activity with respect to a given data block, that computer process alternates the value of its respective handshaking flag. Because two single-bit flags are employed, the combination of the flags can yield only combinations in which the flags are identical (e.g., 1,1 or 0,0) or different (e.g., 1,0 or 0,1). Consequently, whenever one of the computer processes completes an action and alternates its respective handshaking flag, a state of the data block is alternated, either from the readable (or writable) state in which the flag bits are identical to the writable (or readable) state in which the flag bits are different, or vice-versa. The new state as determined by the handshaking flags provides an indication to the other computer process that it now is free to act in relation to the data block, and further provides an indication to the previously-acting computer process that it should not act. Thus, due to the alternation of the handshaking flags, only one of the computer processes operates upon the data block or the handshaking flags at any one time, and repeated operations by each computer process only can occur if those repeated operations are alternated with repeated operations by the other computer process.

Additionally, because each handshaking flag can only be changed by a respective one of the computer processes, there is no danger of collisions occurring in which one computer process overwrites the flag data of another computer process. Further, in contrast to some conventional systems in which bytes or larger amounts of handshaking information are used to determine whether a given data block should be accessed, embodiments of the present invention only require two bits of handshaking information per data block. Additionally, in at least some embodiments of the present invention where two computer processes are accessing multiple data blocks, the handshaking flags corresponding to the multiple data blocks that are set by one of the computer processes are all collected in a first array at one addressable piece of memory (e.g., one or more bytes or words), while the handshaking flags corresponding to the multiple data blocks that are set by the other of the computer processes are all collected in a second array at a different addressable piece of memory. By collecting or packing the respective sets of handshaking flags into these two arrays, in groupings of bytes or similar amounts of data, the handshaking data can be particularly efficiently stored.

In particular, the present invention relates to a method of governing access to a first data portion. The method includes determining whether first and second values associated with the first data portion are the same or different. The method additionally includes performing one of a first operation and a second operation, where the first operation is performed if the first and second values are the same, and the second operation is performed if the first and second values are different. The method further includes changing one of the first and second values upon completion of the one of the first and second operations, where the first value is changed if the first operation was performed, and where the second value is changed if the second operation was performed.

The present invention additionally relates to a method of governing access by first and second processing devices to a plurality of data portions stored in a memory device. The method includes assigning the first and second processing devices as producers and consumers with respect to the data portions, so that for each data portion a respective one of the first and second processing devices is assigned as the producer and a respective other of the first and second processing devices is assigned as the consumer. The method also includes associating respective first and second values with each of the plurality of data portions, where the first processing device is capable of setting each of the first values and the second processing device is capable of setting each of the second values. The method additionally includes monitoring the respective first and second values associated with each of the plurality of data portions at each of the first processing devices, performing writing and reading operations upon the plurality of data portions, and alternating one of the first and second values associated with each respective data portion when one of the operations is performed upon the respective data portion. Writing operations are only performed upon each respective data portion by that one of the first and second processing devices that is the producer with respect to that data portion when the first and second values corresponding to that data portion have a first relationship to one another. Reading operations are only performed upon each respective data portion by that one of the first and second processing devices that is the consumer with respect to that data portion when the first and second values corresponding to that data portion have a second relationship to one another.

The present invention further relates to an information storage and access system. The system includes a memory device that stores a first data portion, a first device for accessing the memory device, where the first device is coupled to the memory device, and a second device for accessing the memory device, where the second device is coupled to the memory device. The memory device further stores a first value and a second value associated with the first data portion, where the first value is modifiable by the first device and the second value is modifiable by the second device. The first device is a producer with respect to the first data portion and the second device is a consumer with respect to the first data portion. The first device modifies the first data portion only after the first device detects that the first and second values have a first relationship with one another, and the first device alternates the first value after modifying the first data portion. The second device reads the first data portion only after the second device detects that the first and second values have a second relationship with one another, and the second device alternates the second value after reading the first data portion.

DETAILED DESCRIPTION OF THE INVENTION

Figure 1:
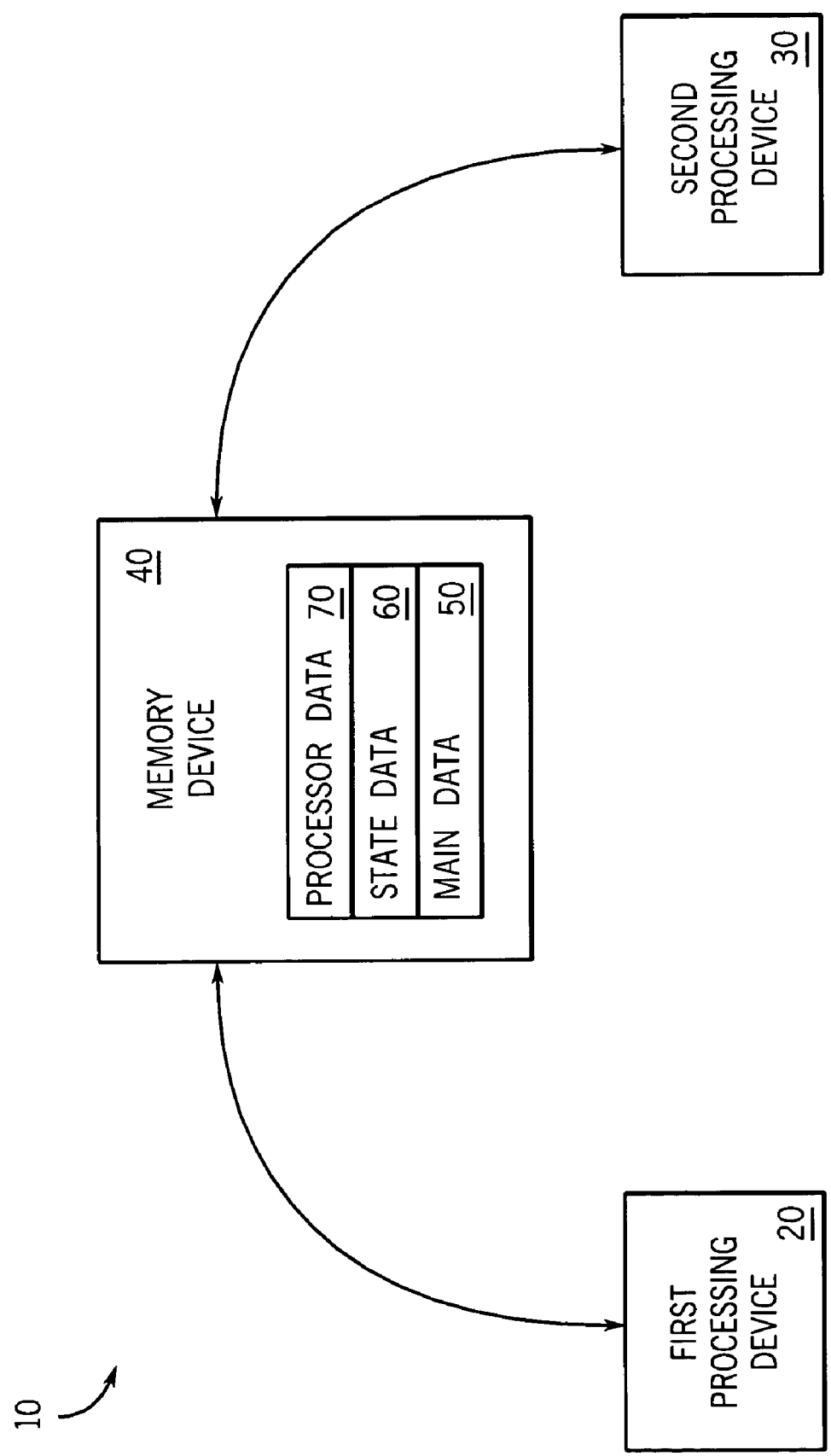
FIG. 1 is a schematic diagram showing an exemplary system in which two processing devices share the same data that is stored in a memory device.

Referring to FIG. 1, an exemplary system 10 is shown in which a first processing device 20 and a second processing device 30 are in communication with a memory device 40. Each of the first and second processing devices 20, 30 communicates with the memory device 40 in order to access main data 50 that is stored within the memory device. The processing devices 20, 30 and memory device 40 are intended to be exemplary of a wide variety of processing devices and memory devices such as microprocessors, programmable logic devices, computers, application specific integrated circuits, magnetic disk memory, random access memory, etc. In one embodiment, the first processing device 20 is a microprocessor on a motherboard and the second processing device 30 is a microcontroller on a daughter board, and the memory device 40 is a dual-port RAM.

Figure 2:
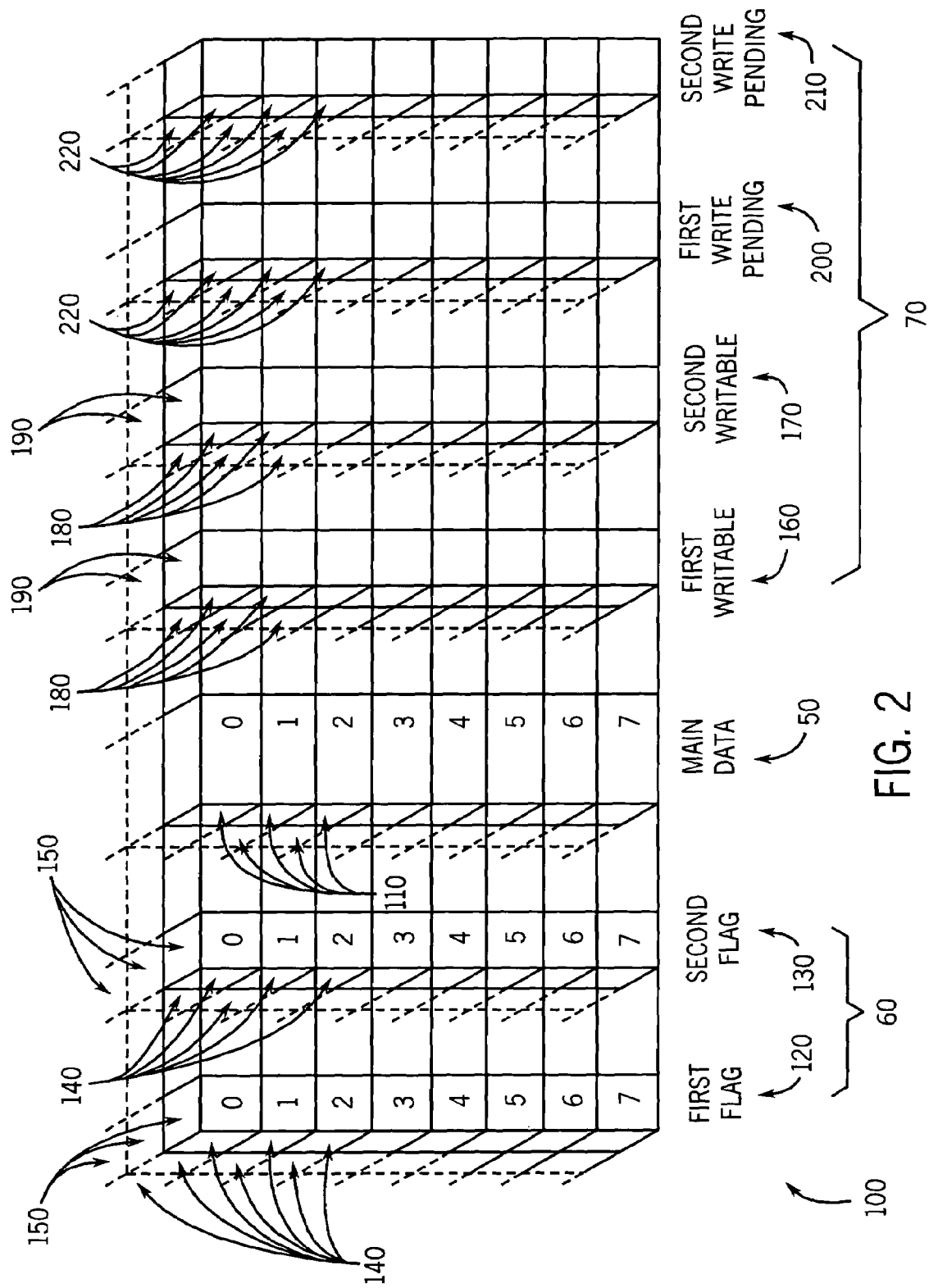
FIG. 2 is a schematic diagram showing an exemplary data structure that is used to coordinate accessing of the data within the memory device of FIG. 1 by the two processing devices of FIG. 1.
Figure 3:
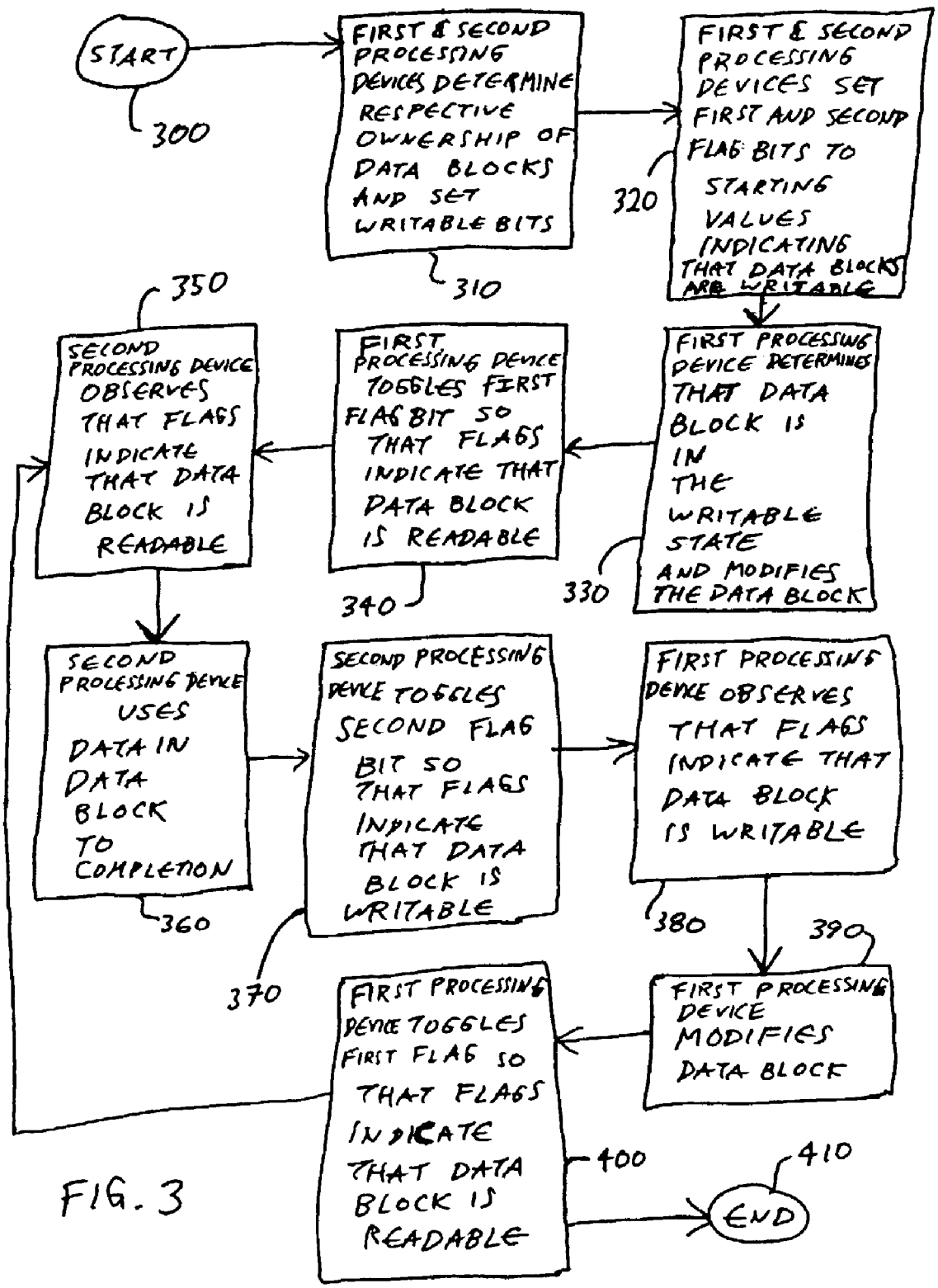
FIG. 3 is a flow chart showing exemplary steps of operation of the system of FIG. 1 with respect to the accessing of data stored in the memory device of FIG. 1.

The main data 50 can include a single portion of data or, more typically, include multiple portions of data or data blocks 110 (see FIG. 2). With respect to each of the data blocks 110, there is one processing device (e.g., the first processing device 20) that constitutes a producer with respect to that data block and another processing device (e.g., the second processing device 30) that constitutes a consumer of that data. That is, with respect to each data block 110, one processing device is configured to access the data in order to create that data for the first time, or to update, modify or write that data (e.g., "produce" that data), while another processing device is configured only to obtain or read the data (e.g., "consume" the data). In the embodiment of FIGS. 1–3, however, either the first processing device 20 or the second processing device 30 is the producer processing device, and the other of those two processing devices is the consumer processing device. The identities of the producer processing device and the consumer processing device can change from data block to data block (e.g., the first processing device can be the producer with respect to a first data block and the consumer with respect to a second data block). In alternate embodiments of the present invention, the memory device 40 can be in communication with more than two processing devices, so long as with respect to each data portion there is one processing device that is a producer and another processing device that is a consumer.

Further as shown in FIG. 1, and additionally as shown in FIG. 2, the memory device 40 in addition to storing the main data 50 stores state data 60 and processor data 70. As shown in particular in FIG. 2, the main data 50, state data 60 and processor data 70 can be stored in the memory device 40 in the form of a data structure 100 made up of a group of arrays. As discussed, the main data 50 is made up of the data blocks 110. The state data 60 includes a first flag data set 120 and a second flag data set 130. In the embodiment shown, each flag 140 of the first flag data set 120 and the second flag data set 130 is a single bit in size, and thus each flag can take on either a value of zero or a value of one. Also as shown, each of the flags 140 of the first flag data set 120 and the second flag data set 130 (one from each set) corresponds to a particular block 110 of the main data 50. Because each flag 140 is a single bit in size, 8 flags 140 corresponding to 8 separate data blocks 110 can be stored in a single byte 150. If the number of data blocks 110 exceeds 8, additional single bit flags 140 can be stored in additional bytes 150 of data in the arrays for the first flag data set 120 and the second flag data set 130. In alternate embodiments, the flags 140 can be stored in data groupings other than bytes (8 bits), for example, words or data groupings of any number of bits (e.g., 16 bits, 32 bits, n bits) that have a dimension equal to the number of bits that are accessible in a single, atomic operation for the system architecture. Also, in alternate embodiments, the processor data 70 corresponding to each of the first and second processing devices 20,30 is stored within local memories at each of those respective processing devices, rather than stored in the shared memory device 40 (which often is a more precious and expensive memory area).

Access to the data blocks 110 of the main data 50 by the first and second processing devices 20, 30 is governed by the state data 60 associated with each of those individual data blocks 110, that is, the values of the flags 140 of the first flag data set 120 and the second flag data set 130 corresponding to the respective data blocks. The combined values of the respective flags 140 of the first and second flag data sets 120, 130 associated with each particular data block represent a state of that data block. As is set forth in greater detail below, the values of the flags 140 are determined by the first and second processing devices 20, 30 themselves, and thus coordinated access of the main data 50 is achieved by way of independent actions on the part of the first and second processing devices 20, 30, without any overarching control mechanism that governs both of the processing devices and/or the memory device 40. In contrast to some conventional systems, the first and second processing devices 20,30 can read the flags 140 of both the first and second flag data sets 120,130 without any clobbering of data (even though each individual flag normally can only be written to by a respective one of the first and second processing devices).

In order for the state data 60 to have meaning, the first and second processing devices 20, 30 must be informed of their respective ownership of the various data blocks 110 of the main data 50. That is, each of the processing devices 20, 30 must determine whether it is the producer with respect to a given data block 110 or the consumer with respect to the given data block. This ownership can be determined as part of an initialization process, and the relevant information can be stored as shown in FIGS. 1–2 as processor data 70 within the memory device 40 or, in alternate embodiments, within respective memory devices in the respective processing devices 20, 30 or at other locations.

As shown in FIG. 2, in one embodiment in which the memory device 40 stores such processor data 70, the ownership status of the first processing device 20 with respect to each given data block 110 is stored within a first writable data array 160, and the ownership status of the second processing device 30 with respect to each given data block is stored within a second writable data array 170. The first and second writable data arrays 160 and 170 each include single-bit memory locations 180, each of which corresponds to a respective data block and can take on a value of zero or one (either a value of zero or a value of one can be used to indicate that a given one of the processing devices 20, 30 is a producer or a consumer). Thus, the first and second writable data arrays 160, 170 provide indications of the respective producer/consumer statuses of the first and second processing devices 20, 30 with respect to each given data block 110. Just as the single bit flags 140 can be stored in the form of multiple bytes 150 if the number of data blocks 110 exceeds 8, likewise the single bit memory locations 180 of the first and second writable data arrays 160, 170 can be in the form of multiple bytes 190 as the number of data blocks 110 increases above 8 (also, in alternate embodiments, as discussed above, the data groupings can be in different amounts of data other than bytes).

Referring to FIG. 3, exemplary steps of operation of the system 10 are shown. Upon starting operation at step 300, the system is then initialized at step 310, in which the processing devices 20, 30 determine their respective ownership of the data blocks 110 and set the memory locations 180 of the first and second writable data arrays 160, 170 to indicate that ownership. Then, at step 320 the processing devices 20, 30 set the flags 140 within the first and second flag data sets 120, 130 with respect to the data blocks 110 to starting values that indicate that the respective data blocks are writable. Depending upon the embodiment, a data block 110 can be indicated to be in a writable state when its two flags 140 are identical (e.g., 0,0 and 1,1) or different (0,1 and 1,0). In the case where a data block 110 is determined to be in a writable state when the state data 60 corresponding to that data block includes flags 140 of the first and second flag data sets 120, 130 that are identical, the initial starting values of the flags 140 may all be set to one (or zero.). In other embodiments, one of the processing devices (e.g., the first processing device 20) alone initializes the starting values of all of the flags 140 of both of the first and second flag data sets 120,130 (e.g., to 0), and provides a signal to the other processing device when the initialization process is complete indicating the completion of that process.

Once the initial values of the flags 140 corresponding to a given data block 110 have been set, and the flags indicate that that data block is in a writable state, the processing device that is considered to be the producer with respect to that data block observes the writable data state and determines that it is appropriate to write to the data block. Thus, at step 330, assuming that the first processing device 20 is the producer with respect to a given data block 110, the first processing device determines that the data in that data block should be modified and proceeds to modify the data (as soon as data for entry into the data block becomes available to the processing device). Then, once the producer processing device (e.g., the first processing device 20) has completed its modification of the data stored in the particular data block 110, that processing device resets its flag with respect to that data block to an opposite value, e.g., the processing device toggles or alternates the flag bit from zero to one or one to zero. Thus, in the present example where the first processing device 20 is the producer of the given data block 110, the first processing device causes the corresponding flag 140 of the first flag data set 120 to be alternated at step 340.

Upon alternation of one of the flags 140, the respective flags of the first and second flag data sets 120, 130 are no longer identical and so the state of the data block 110 is no longer writable but rather is readable. Next, at step 350, the processing device that is the consumer (in this case, the second processing device 30) observes that the state of the data block 110 is now readable, based upon the corresponding flags 140 of the first and second flag data sets 120, 130. Consequently, at step 360, the second processing device 30 reads the data that is currently stored in the data block 110 (that is, consumes the data). Upon consuming the data, the second processing device 30 at step 370 resets the flag 140 of the second flag data set 130 that corresponds to the particular data block 110 so that the state of the data block is again indicated by the flags to be writable, that is, the flags again are identical in value. It should be noted that the data block 110 again is considered to be in the writable state despite the fact that the corresponding flags 140 of the first and second data sets 120, 130 each have a value that is the opposite of the value to which the flags were set in step 320, e.g., zero.

Next, at step 380, the processing device that is the producer processing device (in this case, the first processing device 20) again observes that the state of the data block 110 again is indicated to be the writable state based upon the corresponding flags 140 of the first and second flag data sets 120, 130. In response, the first processing device 20 again modifies or writes to the data block 110 to update the information stored in the data block at step 390. This updating only occurs once the first processing device 20 determines that such updating is necessary. That is, unless the stored data needs updating, the first processing device 20 will not update the data block 110 and consequently the state of that data block will not be changed to allow the second processing device 30 to read the data. After the data in the data block 110 is modified by the first processing device 20 at step 390, the first processing device again toggles the flag 140 of the first flag data set 120 corresponding to that data block at step 400. In this case, since the previous value of the flag 140 was zero, the flag is toggled back to a one. As in step 350, upon the toggling of the flag, the flags 140 corresponding to the data block 110 of the first and second flag data sets 120, 130 are different, and the state of the data block again is a readable state. As shown, upon completing step 400, the process can return to step 350 and repeat over and over again as the data is repeatedly read by the second processing device 30 and updated by the first processing device 20, or the process can be ended at step 410. Indeed, the process can be ended at any of the steps shown in FIG. 3, and not only at the completion of step 400. Further, in embodiments of the system 10 such as that shown in FIG. 2, the steps 330–400 are performed with respect to each of the data blocks 110.

Referring again to FIG. 2, in certain embodiments of the invention, the processor data 70 further includes first and second write pending data sets 200 and 210, respectively. In the embodiment of FIG. 2, each of the first and second write pending data sets 200 and 210 includes a series of single bit memory locations 220 that respectively (one memory location from each set) correspond again to each of the data blocks 110. The first write pending data set 200 pertains to the first processing device 20 and includes single-bit memory locations 220 that are respectively set to one whenever both the first processing device 20 is a producer with respect to the respective data blocks 110 and, at the current time, has data that should be written to the respective data blocks. Similarly, the second write pending data set 210 pertains to the second processing device 30 and includes single-bit memory locations 220 that are respectively set to one whenever both the second processing device 30 is a producer with respect to the respective data blocks 110 and, at the current time, has data that should be written to the respective data blocks. The respective single-bit memory locations 220 of the first and second write pending data sets 200, 210 with respect to a given data block 110 are always equal to zero when the processing device 20, 30 to which that memory location corresponds is a consumer rather than a producer.

The write pending data sets 200 and 210, in combination with the first and second writable data sets 160 and 170 and the first and second flag data sets 120 and 130, make it possible for the processing devices 20 and 30 to rapidly determine whether the respective processing devices should be acting in regards to the different data blocks 110 and, if it is appropriate for actions to be performed, whether the actions should involve writing to the respective data blocks or reading from the data blocks. In particular, the values of the flags 140 and memory locations 180 and 220 can be input into a simple formula that allows the processing devices 20, 30 to rapidly determine what operations need to be done, even when the main data 50 includes many different data blocks 110. Specifically, the following equation (1) can be employed by a given one of the processing devices 20, 30 to determine whether it needs to perform an action in relation to a given data block:

$$\text{WorkNeeded} = (\text{Flag1 } XOR \text{ Flag2 } XOR \text{ Writable}) \\ \text{AND } (\text{WritePending OR } (\text{NOT Writable})) \quad (1)$$

Thus, one of the processors, 20, 30, for example, the first processor 20, can easily calculate whether it is appropriate for it to take an action with respect to a particular one of the data blocks 110 by simply: (a) performing an exclusive-or (XOR) operation between the values of the flags 140 of the first and second flag data sets 120, 130 corresponding to that data block, followed by performing an exclusive-or operation with respect to the result of the previous operation and the value of the memory location 180 of the first writable data set 160 corresponding to that data block, to obtain a first result; (b) performing an OR operation between the value of the memory location 220 of the first write pending data set 200 and the inverse of the value of the memory location 180 of the first writable data set 160 corresponding to that data block 110 to obtain a second result; and then performing an AND operation upon the first and second results. If the value of WorkNeeded is determined to be 1, then the first processor 20 should act upon the data block 110, and if not, no action should be taken. The same formula can be applied with respect to the second processing device 30 by performing the same calculation, but instead using the indications 180 and 220 associated with the second writable data set 170 and the second write pending data set 210 corresponding to the data block 110 instead of the indications 180, 220 of the first writable data set 160 and the first write pending data set 200.

Additionally, once it is determined by a given processing device that an operation should be performed by that processing device with respect to a given data block 110, additional simple calculations can be performed to determine what type of operation (e.g., read or write) should be performed. This is valuable insofar as, in some embodiments, the number of data blocks 110 is large and the producer/consumer identity of each processing device can vary from data block to data block. In particular, if an AND operation is performed upon the WorkNeeded value calculated for a given processing device with respect to a given data block 110, and the value of the memory location 220 of the first or second write pending data sets 200 or 210 corresponding to that particular processing device with respect to that data block, then the result is indicative of whether that processing device should write to the corresponding data block (e.g., if the result is a one, then the processing device should write to the data block 110, and if the result is a zero then the processing device should not write to the data block). Also, if an AND operation is performed upon the WorkNeeded value calculated for a given processing device with respect to a given data block 110, and the inverse of the value of the memory location 180 of the writable data set 160 or 170 corresponding to the particular processing device and data block, then the result is indicative of whether the processing device should read data at that data block (e.g., that the processing device should consume the data). Typically, only one or the other of these calculations needs to be performed in order to determine whether both a first processing device should read or write with respect to a given data block and a second processing device should write or read with respect to that data block.

These techniques, which facilitate the ability of the processing devices 20, 30 to rapidly determine what actions should be taken with respect to many data blocks 110 in the main data 50, can be extended to produce a higher level of coherency in the operation of several of the data blocks 110. For example, in certain embodiments, particularly some embodiments in which the data stored in several of the data blocks 110 is used (and accessed) together, it may be desirable to guarantee that all of those data blocks are written to simultaneously and, additionally, desirable to prevent the states of those data blocks (as represented by the flag data sets 120,130) to change to a readable state until such time as all of the data blocks have been successfully written to. One manner of providing this type of operation, with respect to multiple data blocks 110 for which the first processing device 20 is the producer, is by controlling the memory locations 220 of the first write pending data set 200 corresponding to each of those data blocks simultaneously, and then only allowing changes to the flags 140 to occur upon the simultaneous alternating of all of those memory locations 220.

It is specifically intended that the present invention not be limited to the embodiments and illustrations contained herein, but that modified forms of those embodiments including portions of the embodiments and combinations of elements of different embodiments also be included as come within the scope of the following claims.

We claim:

1. A method of governing access to a first data portion, the method comprising:
   determining whether first and second values associated with the first data portion are the same or different;
   performing a first operation and a second operation, wherein the first operation is performed if the first and second values are the same, and the second operation is performed if the first and second values are different;
   changing the first and second values upon completion of the first and second operations, wherein the first value is changed if the first operation was performed, and wherein the second value is changed if the second operation was performed; and
   setting the first and second values to first and second initial values, respectively, wherein the first data portion is in a first state when the first and second values are the same, and in a second state when the first and second values are different.

2. The method of claim 1,
   wherein the first and second values are each single-bit values, and
   wherein a first processing device is capable of setting the first value but not the second value, and a second processing device is capable of setting the second value but not the first value.

3. The method of claim 2, further comprising:
   setting a convention according to which the first processing device is a producer of the first data portion and the second processing device is a consumer of the first data portion.

4. The method of claim 3, wherein the first operation is performed by the first processing device and involves modification of the first data portion, and the second operation is performed by the second processing device and involves reading of the first data portion.

5. The method of claim 4, wherein third and fourth values are associated with a second data portion, wherein the first processing device is a consumer and the second processing device is a producer with respect to the second data portion.

6. The method of claim 5, further comprising performing one of a third operation and a fourth operation, wherein the third operation is performed if the third and fourth values are the same, and the fourth operation is performed if the third and fourth values are different; and
   changing one of the third and fourth values upon completion of the one of the third and fourth operations, wherein the third value is changed if the third operation was performed, and wherein the fourth value is changed if the fourth operation was performed.

7. The method of claim 4, further comprising:
   performing the other of the first and second operations, wherein the first operation is performed if the first and second values are the same, and the second operation is performed if the first and second values are different; and
   changing the other of the first and second values upon completion of the other of the first and second operations, wherein the first value is changed if the first operation was performed, and wherein the second value is changed if the second operation was performed.

8. The method of claim 3, wherein the first and second values are stored in association with the first data portion in a memory device coupled to the first and second processing devices.

9. The method of claim 3, further comprising:
   storing third and fourth values indicating that the first processing device is a producer with respect to the first data portion and the second processing device is a consumer with respect to the first data portion, respectively; and
   storing a fifth value that is indicative of whether the first processing device is waiting to modify the first data portion.

10. The method of claim 9, wherein the first processing device is able to determine whether it needs to perform an operation with respect to the first data portion based upon the values of the first, second, third and fifth values, and wherein the second processing device is able to determine whether it needs to perform an operation with respect to the first data portion based upon the values of the first, second, fourth and sixth values.

11. The method of claim 10, wherein the first processing device determines a seventh value indicative of whether it needs to perform an operation with respect to the first data portion based upon the following formula for determining the seventh value:

$$\text{seventh value} = (\text{first value XOR second value XOR third value}) \text{ AND } (\text{fifth value OR } (\text{NOT third value})); \text{ and}$$

wherein the second processing device determines an eighth value indicative of whether it needs to perform an operation with respect to the first data portion based upon the following formula for determining the eighth value:

$$\text{eighth value} = (\text{first value XOR second value XOR fourth value}) \text{ AND } (\text{sixth value OR } (\text{NOT fourth value})).$$

12. The method of claim 11, wherein the first processing device determines whether it needs to modify the first data portion by calculating a ninth value equaling the seventh value ANDed with the fifth value.

13. A method of governing access by first and second processing devices to a plurality of data portions stored in a memory device, the method comprising:
    assigning the first and second processing devices as producers and consumers with respect to the data portions, so that for each data portion a respective one of the first and second processing devices is assigned as the producer and a respective other of the first and second processing devices is assigned as the consumer;

associating respective first and second values with each of the plurality of data portions, wherein the first processing device is capable of setting each of the first values and the second processing device is capable of setting each of the second values;

monitoring the respective first and second values associated with each of the plurality of data portions at each of the first processing devices;

performing writing and reading operations upon the plurality of data portions; and alternating one of the first and second values associated with each respective data portion when one of the operations is performed upon the respective data portion, wherein writing operations are only performed upon each respective data portion by that one of the first and second processing devices that is the producer with respect to that data portion when the first and second values corresponding to that data portion have a first relationship to one another, and wherein reading operations are only performed upon each respective data portion by that one of the first and second processing devices that is the consumer with respect to that data portion when the first and second values corresponding to that data portion have a second relationship to one another.

14. The method of claim 13, further comprising:

storing a respective third value with respect to each of the data portions, wherein each respective third value is indicative of whether the first processing device is a producer with respect to the respective data portion;

storing a respective fourth value with respect to each of the data portions, wherein each respective fourth value is indicative of whether the second processing device is a producer with respect to the respective data portion;

storing a respective fifth value with respect to each of the data portions, wherein each respective fifth value is indicative of whether the first processing device is waiting to modify the respective data portion; and storing a respective sixth value with respect to each of the data portions, wherein each respective sixth value is indicative of whether the second processing device is waiting to modify the respective data portion.

15. The method of claim 14, wherein each of the first, second, third, fourth, fifth and sixth values are stored within first, second, third, fourth, fifth and sixth arrays, wherein each of the arrays is a two-dimensional array having a first dimension of n bits, and wherein the alternating of the one of the first and second values with respect to the data blocks in a first group of n data blocks only occurs after operations have been performed with respect each of the data blocks in the first group.

16. An information storage and access system, the system comprising:

a memory device that stores a first data portion;

a first device for accessing the memory device, wherein the first device is coupled to the memory device; and a second device for accessing the memory device, wherein the second device is coupled to the memory device;

wherein the memory device further stores a first value and a second value associated with the first data portion, wherein the first value is modifiable by the first device and the second value is modifiable by the second device;

wherein the first device is a producer with respect to the first data portion and the second device is a consumer with respect to the first data portion;

wherein the first device modifies the first data portion only after the first device detects that the first and second values have a first relationship with one another, and the first device alternates the first value after modifying the first data portion; and wherein the second device reads the first data portion only after the second device detects that the first and second values have a second relationship with one another, and the second device alternates the second value after reading the first data portion.

17. The system of claim 16, wherein each of the first and second values is capable of taking on values of zero and one, wherein the first and second values indicate that the data portion is in a writable state when the first and second values are identical, wherein the first and second values indicate that the data portion is in a readable state when the first and second values differ from one another.

18. The system of claim 16, wherein the memory device is a dual-port random access memory including a data structure for storing main data and state data, the first device includes a first means for processing and a first local memory that stores first processing data, and the second device includes a second means for processing and a second local memory that stores second processing data.

19. The system of claim 16, wherein the memory device further stores a plurality of additional data portions, a plurality of additional first and second values associated with the additional data portions, respectively, and a plurality of third, fourth, fifth and sixth values associated with the first data portion and each of the additional data portions, respectively;

wherein, with respect to each of the additional data portions, a respective one of the first and second devices is a producer and a respective other of the first and second devices is a consumer, and wherein the first device determines whether it should be performing operations in relation to the first data portion and the additional data portions, respectively, based upon the respective first, second, third and fifth values associated with the respective data portions, and the second device determines whether it should be performing operations in relation to the first data portion and the additional data portions, respectively, based upon the respective first, second, fourth and sixth values associated with the respective data portions.

* * * * *